(12) United States Patent
Kim (10) Patent No.: US 8,560,301 B2
(45) Date of Patent: Oct. 15, 2013

(54) APPARATUS AND METHOD FOR LANGUAGE EXPRESSION USING CONTEXT AND INTENT AWARENESS

(75) Inventor: Yeo Jin Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 859 days.

(21) Appl. No.: 12/715,423

(22) Filed: Mar. 2, 2010

(65) Prior Publication Data

US 2010/0299138 A1 Nov. 25, 2010

(30) Foreign Application Priority Data

May 22, 2009 (KR) .................. 10-2009-0045020

(51) Int. Cl.
| | |
|---|---|
| G10L 15/06 | (2013.01) |
| G10L 17/00 | (2013.01) |
| G10L 15/26 | (2006.01) |
| G10L 21/00 | (2013.01) |
| G10L 13/08 | (2013.01) |
| G10L 13/00 | (2006.01) |
| G10L 11/04 | (2006.01) |
| G10L 11/06 | (2006.01) |
| G10L 15/00 | (2013.01) |
| G06F 17/28 | (2006.01) |
| G06F 17/27 | (2006.01) |
| G06F 17/21 | (2006.01) |

(52) U.S. Cl.
USPC .......... 704/9; 704/3; 704/4; 704/10; 704/235; 704/246; 704/243; 704/270; 704/270.1; 704/275; 704/260; 704/258; 704/207; 704/208; 704/210; 704/214; 704/215; 704/231; 704/257

(58) Field of Classification Search
USPC .............. 704/3, 4, 9, 10, 235, 246, 243, 270, 704/270.1, 275, 260, 258, 207, 208, 210, 704/214, 215, 231, 257
See application file for complete search history.

(56) References Cited

U.S. PATENT DOCUMENTS

| | | | |
|---|---|---|---|
| 6,381,465 B1 * | 4/2002 | Chern et al. | 455/466 |
| 6,728,679 B1 * | 4/2004 | Strubbe et al. | 704/270.1 |
| 6,731,307 B1 * | 5/2004 | Strubbe et al. | 715/727 |
| 6,795,808 B1 * | 9/2004 | Strubbe et al. | 704/275 |
| 7,254,384 B2 * | 8/2007 | Gailey et al. | 455/412.1 |
| 7,778,632 B2 * | 8/2010 | Kurlander et al. | 455/418 |

(Continued)

FOREIGN PATENT DOCUMENTS

| | | |
|---|---|---|
| JP | 08-161174 | 6/1996 |
| KR | 1020010022524 | 3/2001 |

(Continued)

OTHER PUBLICATIONS

Choudhury et al, "Towards Activity Databases: Using Sensors and Statistical Models to Summarize People's Lives," IEEE Data Eng. Bull, 29(1): 49-58, Mar. 2006.*

*Primary Examiner* — Edgar Guerra-Erazo
(74) *Attorney, Agent, or Firm* — NSIP Law (57) ABSTRACT

A language expression apparatus and a method based on a context and a intent awareness, are provided. The apparatus and method may recognize a context and an intent of a user and may generate a language expression based on the recognized context and the recognized intent, thereby providing an interpretation/translation service and/or providing an education service for learning a language.

20 Claims, 4 Drawing Sheets

(56) References Cited

U.S. PATENT DOCUMENTS

| | | | |
|---|---|---|---|
| 2002/0087525 A1* | 7/2002 | Abbott et al. | 707/3 |
| 2003/0154476 A1* | 8/2003 | Abbott et al. | 725/37 |
| 2006/0286527 A1* | 12/2006 | Morel | 434/307 R |
| 2007/0099602 A1 | 5/2007 | Kurlander et al. | |
| 2008/0005053 A1* | 1/2008 | Pulsipher | 706/45 |
| 2008/0044048 A1* | 2/2008 | Pentland | 381/315 |
| 2008/0243501 A1* | 10/2008 | Hafsteinsson et al. | 704/235 |
| 2009/0048821 A1* | 2/2009 | Yam et al. | 704/3 |
| 2009/0240488 A1* | 9/2009 | White et al. | 704/9 |
| 2009/0243998 A1* | 10/2009 | Wang | 345/156 |
| 2009/0282114 A1* | 11/2009 | Feng et al. | 709/206 |
| 2010/0153321 A1* | 6/2010 | Savvides et al. | 706/13 |
| 2010/0202670 A1* | 8/2010 | Tian et al. | 382/118 |
| 2010/0222102 A1* | 9/2010 | Rodriguez | 455/557 |
| 2010/0241418 A1* | 9/2010 | Maeda et al. | 704/9 |
| 2010/0251177 A1* | 9/2010 | Geppert et al. | 715/821 |
| 2011/0035445 A1* | 2/2011 | Eickhoff | 709/204 |
| 2011/0082688 A1* | 4/2011 | Kim et al. | 704/9 |

FOREIGN PATENT DOCUMENTS

| | | |
|---|---|---|
| KR | 1020060043333 | 5/2006 |
| KR | 1020060066587 | 6/2006 |
| KR | 1020070056673 | 6/2007 |
| KR | 1020080072673 | 8/2008 |

* cited by examiner

FIG. 4

APPARATUS AND METHOD FOR LANGUAGE EXPRESSION USING CONTEXT AND INTENT AWARENESS

CROSS-REFERENCE TO RELATED APPLICATION

This application claims the benefit under 35 U.S.C. §119(a) of a Korean Patent Application No. 10-2009-0045020, filed on May 22, 2009, in the Korean Intellectual Property Office, the entire disclosure of which is incorporated herein by reference for all purposes.

BACKGROUND

1. Field

The following description relates to an apparatus and method for language expression, more particularly, to a language expression apparatus and a method based on a context and intent awareness which may recognize a context and an intent of a user, generate a language expression based on the recognized context and the recognized intent, and output the generated language expression.

2. Description of Related Art

Translating one language to another requires an understanding of two languages. However, if a person only understands one language, it is very difficult to translate between two different languages. Thus, it is very difficult for a user to communicate, in an environment where a foreign language is spoken.

Apparatuses and methods may infer an intent of a user by obtaining action information of the user and context information from circumstances and/or facts that surround the user.

A context awareness apparatus may recognize and determine various context that occurs around the user, and may provide a service corresponding to the context. The context awareness apparatus may receive and analyze various circumstances in a surrounding environment of a user, and generate context information corresponding to the circumstances.

An intent information apparatus may recognize and determine various intentions of a user. For example, the apparatus may recognize events occurring around the user or generated by the user, recognize the intent of the user, and generate intent information.

SUMMARY

In one general aspect, there is provided an apparatus for a language expression based on a context and intent awareness, the apparatus comprising a context recognizing unit to recognize a context of a user by analyzing sensing information collected from the user's environment, an intent recognizing unit to recognize an intent of the user based on the recognized context, a language generating unit to generate a language expression based on the recognized context and the recognized intent, and an output unit to convert the generated language expression into a language that is understandable to the user, and to output the converted language expression.

The apparatus may further comprise a knowledge database to store and maintain a knowledge model of at least one domain knowledge, a behavioral model database to store and maintain a user behavior information model including at least one of a user profile of the user, a preference of the user, and a pattern of the user, and a language database to store and maintain data with respect to the language that is understandable to the user.

The context recognizing unit may recognize the context of the user through at least one of a retrieval analysis with respect to the user's environment, a logical inference, a pattern recognition, and may combine the collected sensing information with the knowledge model or the behavioral model.

The intent recognizing unit may derive at least one inference intent by combining the recognized context with at least one of a cognitive model, the knowledge model, and the behavioral model.

The intent recognizing unit may recognize the intent of the user based on a predetermined evaluation function predetermined for the at least one analyzed inference intent.

The evaluation function may analyze a result of an evaluation with respect to a preference of the user and a detailed intent of the user corresponding to the at least one analyzed inference intent.

The apparatus may further comprise an information collecting unit to collect the sensing information from the user's environment through at least one of a hardware sensor and a software sensor.

The hardware sensor may comprise at least one of a location identification sensor, a proximity identification sensor, a radio frequency identification (RFID) tag identification sensor, a motion sensor, an acceleration sensor, a gravity sensor, a pressure sensor, a sound sensor, a vision sensor, a touch sensor, a temperature sensor, a humidity sensor, a light sensor, and a bio-sensor.

The software sensor may collect sensing data from at least one of an electronic calendar application, a scheduler application, an e-mail management application, a message management application, a communication application, a social network application, and a web site management application.

The language generating unit may generate a first language expression by selecting at least one of a form, a sentence, and a phrase corresponding to the recognized context and the recognized intent.

The language generating unit may generate a second language expression corresponding to the recognized context and the recognized intent, by combining the first language expression with the collected sensing information.

The output unit may convert the second language expression into the language that is understandable to the user and may output the converted second language expression.

The language generating unit may perform one of setting of a language for the language expression based on a location of the user, and receiving of language set information for the language expression from the user.

In another aspect, provided is a method for a language expression based on a context and intent awareness, the method comprising recognizing a context of a user by analyzing sensing information collected from the user's environment, recognizing an intent of the user based on the recognized context, generating the language expression based on the recognized context and the recognized intent, converting the generated language expression into a language that is understandable to the user, and outputting the converted language expression.

The recognizing of the context of the user may recognize the context of the user through at least one of a retrieval analysis with respect to the user's environment, a logical inference, a pattern recognition, and may combine the collected sensing information with a knowledge model or a behavioral model.

The recognizing of the intent of the user may derive at least one inference intent by combining the recognized context with at least one of a cognitive model, a knowledge model, and a behavioral model.

The recognizing of the context of the user may comprise collecting the sensing information from the user's environment through at least one of a hardware sensor and a software sensor.

The generating of the language expression may generate a first language expression by selecting at least one of a form, a sentence, and a phrase, corresponding to the recognized context and the recognized intent, and may generate a second language expression corresponding to the recognized context and the recognized intent, by combining the first language expression with the collected sensing information.

The converting and outputting of the language expression may convert the second language expression into the language that is understandable to the user and outputs the converted second language expression.

In another aspect, provided is a computer readable recording media storing a program for implementing a method comprising recognizing a context of a user by analyzing sensing information collected from the user's environment, recognizing an intent of the user based on the recognized context, generating the language expression based on the recognized context and the recognized intent, converting the generated language expression into a language that is understandable to the user, and outputting the converted language expression.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
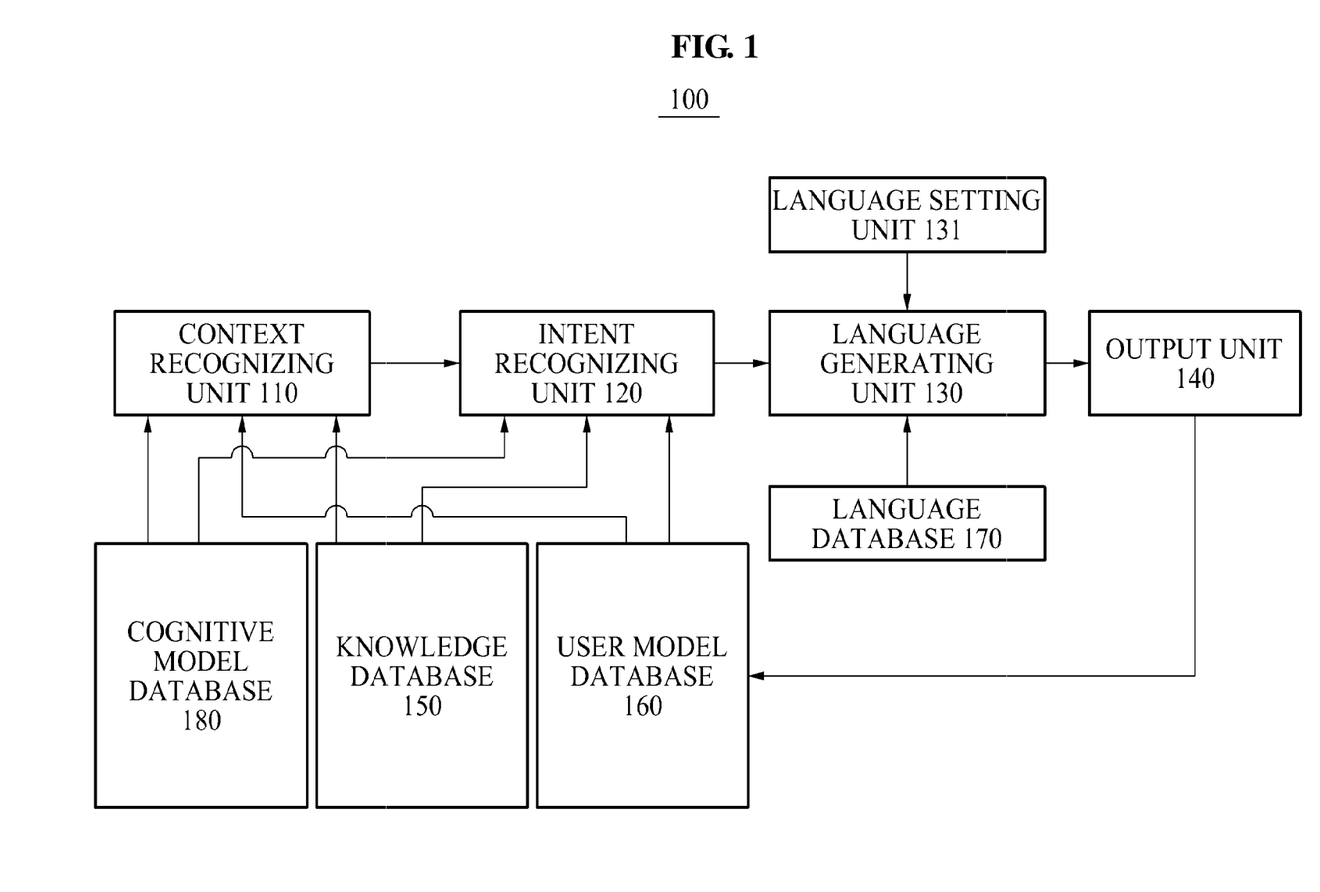
FIG. 1 is a diagram illustrating an example of a language expression apparatus.

FIG. 1 illustrates an example of a language expression apparatus. The language expression apparatus 100 recognizes context and intent of a user and generates a corresponding language expression.

The language expression apparatus 100 may include a context recognizing unit 110, an intent recognizing unit 120, a language generating unit 130, and an output unit 140.

The context recognizing unit 110 may analyze sensing information collected from a user's environment and may recognize the context of the user. The context may be recognized based on the sensing information, a knowledge model, and/or a behavioral model. For example, a search, a logical inference, a pattern recognition, and the like, may be used to recognize context information of the user. The recognized information may be generated as context.

The intent recognizing unit 120 may recognize the intent of the user based on the recognized context.

The language generating unit 130 may generate a language expression corresponding to the recognized context and the recognized intent based on the recognized context and the recognized intent.

The output unit 140 may convert the generated language expression into a language that is understandable to a user, and may output the converted language expression.

The language expression apparatus 100 may further include a knowledge database 150, a behavioral model database 160, and a language database 170.

The knowledge database 150 may store and maintain a knowledge model of at least one domain knowledge.

The behavior model database 160 may store and maintain a behavior information model that may include, for example, at least one of a behavioral profile of the user, preferences of the user, patterns of the user, and the like.

The language database 170 may store and maintain data with respect to a language that is understandable to the user.

Accordingly, the context recognizing unit 110 may recognize the context of the user by analyzing the sensing information collected from the user's environment based on at least one of the knowledge database 150, the behavioral model database 160, and the language database 170

For example, the context recognizing unit 110 may recognize the context of the user through at least one of a retrieval analysis of the user's environment, a logical inference, and a pattern recognition, and combine the collected sensing data with at least one of the knowledge model and the behavioral model.

In addition, the intent recognizing unit 120 may recognize the intent of the user based on the recognized context, by referring to the knowledge database 150, the behavioral model database 160, and the language database 170.

At least one of the context recognizing unit 110 and the intent recognizing unit 120 may refer to a cognitive model stored in a cognitive model database 180, and either may recognize the context of the user or recognize the intent of the user according to the recognized context.

For example, the intent recognizing unit 120 may combine the recognized context with at least one of the cognitive model, the knowledge model, and the behavioral model, and may derive at least one inference intent. The intent recognizing unit 120 may recognize the intent of the user based on a predetermined evaluation function predetermined for the at least one analyzed inference intent. The evaluation function used by the intent recognizing unit 120 may be used for analyzing a result of an evaluation with respect to user preferences and a detailed intent of the user corresponding to the at least one analyzed inference intent.

The language expression apparatus 100 may further include an information collector (not illustrated) to collect the sensing information from the user's environment through a hardware sensor or a software sensor.

For example, the hardware sensor may be at least one of a location identification sensor, a proximity identification sensor, a radio frequency identification (RFID) tag identification sensor, a motion sensor, an acceleration sensor, a gravity sensor, a pressure sensor, a sound sensor, a vision sensor, a touch sensor, a temperature sensor, a humidity sensor, a light sensor, a bio-sensor, and the like. As an example, the location identification sensor may sense location identification information of the user by using a global positional system (GPS). As another example, the proximity identification sensor may sense that an object is close to the user using a local communication module, for example, Bluetooth® equipment, manufactured by Bluetooth Sig, Inc., Bellevue, Wash., and the like.

The RFID tag identification sensor may sense RFID tag identification information from an RFID tag using an RFID reader.

The information collector (not illustrated) may collect the sensing information for recognizing a context of the user's environment using one or more hardware sensors.

The information collector may collect various sensing information, for example, motion sensing information of the motion of the user, sound sensing information occurring within a distance from the user, vision sensing information, touch sensing information, temperature sensing information, humidity sensing information, and the like.

The software sensor may collect sensing data provided from software applications, for example, an electronic calendar application, a scheduler application, an e-mail management application, a message management application, a communication application, a social network application, a web site management application, and the like.

Examples of the sensing data that the software sensor may collect includes, for example, schedule information of the user, acquaintance information, train ticket reservation information, hotel accommodation reservation information, and the like. The acquaintance information may be, for example, family information of the user, social network information, and the like.

The information that the hardware sensor collects and the information that the software sensor collects may be used for recognizing the context of the user and the intent of the user.

For example, the software sensor may determine schedule information, for example, that the user goes to Busan Railway Station on business from Seoul Railway Station. This information may be considered to recognize the context and intent of the user.

The hardware sensor may sense that a current location of the user is Seoul Railway Station using a GPS sensor, and may recognize that the user is located in Seoul Railway Station to go on a business trip based on the schedule information. This information may be recognized as the context and the intent of the user.

In another example, the software sensor may collect reservation information of the user from an external server and may recognize the context of the user and the intent of the user.

For example, the software sensor may collect reservation information of a train ticket for Busan from Seoul from the external server that provides a train reservation/confirmation service. A hardware sensor may sense that the location of the user is the Seoul Railway Station, and also, a plan of the business trip (the schedule information) and the reservation information may be sensed by the software sensor. Thus, the context of the user and the intent of the user may be recognized.

The external server may be a server of a business that provides transportation and accommodation service.

In the described example implementation, accommodation reservation information at Busan may be collected from a corresponding server. In addition to the current location of the user (Seoul Railway Station), the plan of business trip (Seoul->Busan), and reservation information of the train ticket for Busan may also be recognized.

For example, when the accommodation reservation indicates that a reservation for three days at a Busan hotel has been made, accommodation reservation information may be collected from a related server, and the context of the user and the intent of the user may be recognized as the user will stay for three nights at Busan.

The language generating unit 130 may generate a first language expression by selecting, for example, a form, a sentence, a phrase, a combination thereof, and the like, and use this information to recognize the context and intent of the user.

In addition, the language generating unit 130 may generate a second language expression corresponding to the recognized context and the recognized intent by combining the first language expression and the collected sensing information.

In this instance, the output unit 140 may convert the generated second language expression into a language that is understandable to the user and may output the converted language.

The language generating unit 130 may set a language for the language expression based on the location of the user For example, when the user is located in Japan, the language generating unit 130 may generate the corresponding language in Japanese, and when the user is located in China, the language generating unit 130 may generate the corresponding language in Chinese.

To achieve this, a hardware sensor may identify the current location of the user using a location identification sensor.

The language generating unit 130 according to other example implementations may receive language setting information for the language expression from the user, and may generate the language expression based on the received language setting information.

The user may set the language to be generated as the desired language regardless of the current location of the user. For example, although the user is located in the Republic of Korea, the user may learn a foreign language through the context and the intent that are translated into various languages.

The language generating unit 130 may generate the recognized intent of the user as a series of logical sentences based on a story planner module that plans an expression sequence for a natural communication, and the like.

The output unit 140 may convert the generated language into output data, for example, text data, voice data, and the like. The output unit 140 may output the text data on a display device or may convert the generated language into voice data and may output the voice data through a speaker device.

Hereinafter, services provided by the language expression apparatus 100 will be described in detail with reference to FIGS. 2 and 3.

Figure 2:
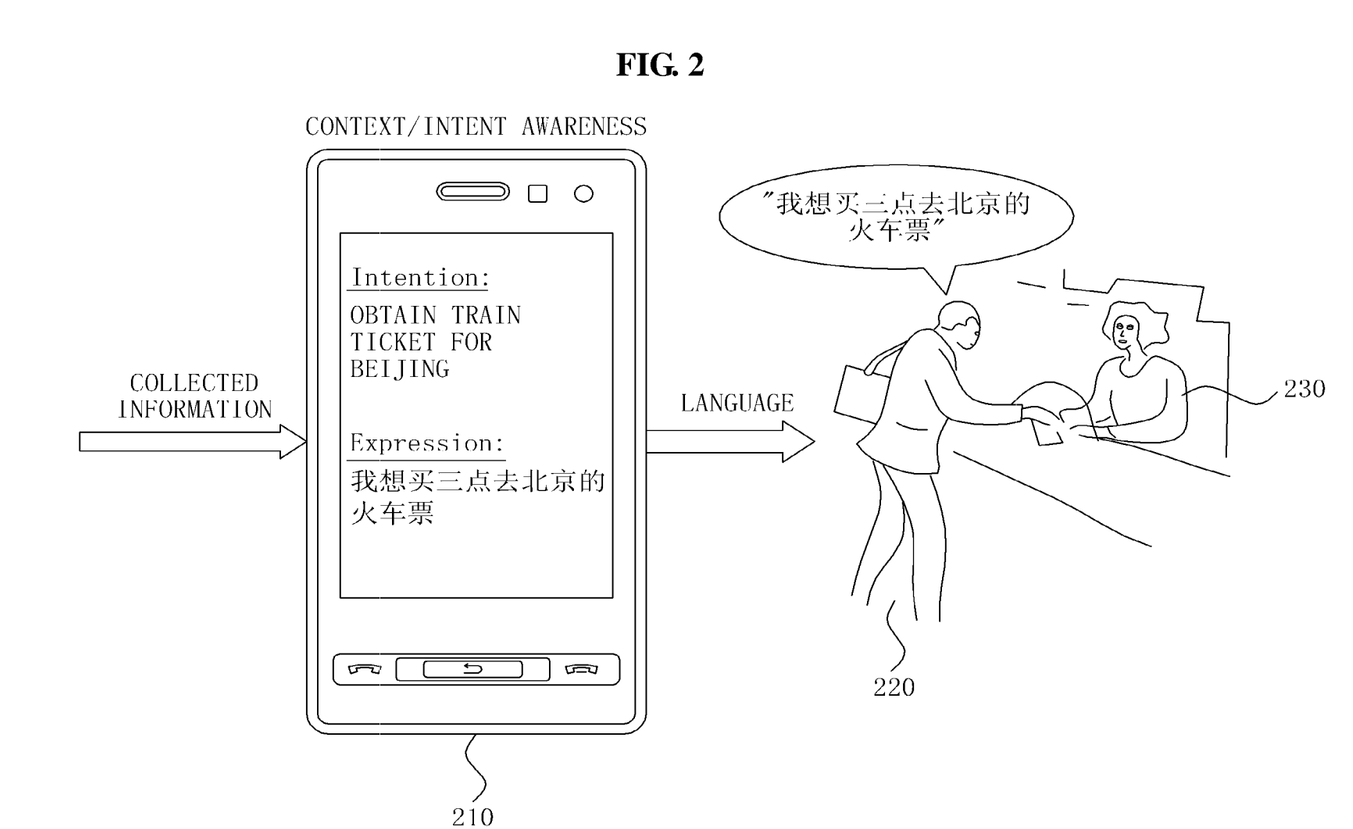
FIG. 2 is a diagram illustrating an example of a foreign language translation service provided by a language expression apparatus.

FIG. 2 illustrates an example of a foreign language translation service provided by a language expression apparatus.

Referring to FIG. 2, a user 220 of the language expression apparatus 210 may make a reservation for accommodation at a hotel in Beijing for today and may stand in front of a ticket box at a Shanghai Railway Station during a trip.

An example of the language expression apparatus is described herein. For example, the language expression apparatus 210 may recognize that the user 220 is located in front of a ticket box of the Shanghai Railway Station in China, using an attached GPS sensor, and the language expression apparatus 210 may collect schedule information from an electronic scheduler that is an application provided by the language expression apparatus 210. Using this information, the language expression apparatus 210 may recognize that a starting point of the user is Shanghai and a destination is Beijing.

Accordingly, the language expression apparatus 210 based on the context and intent awareness may combine a cognitive model, a knowledge, or a user model based on the recognized context, thereby recognizing a detailed intent of the user 220. To infer the user intent, an intent may be selected based on various evaluation functions, such as the concreteness of the intent and preferences of the user 220.

In addition, when one or more intentions are inferred, a plurality of intentions may be provided to enable the user 220 to select an intent.

A logical inference and/or a pattern recognition may be used for deriving the intent of the user 220. In some embodiments, a combination of at least one of the logical inference and the pattern recognition may also be used to derive the intent of the user 220.

For example, as described above, the language expression apparatus 210 may infer that the context of the user 220 is a current location of the user 220 at a ticket box at Shanghai Railway Station, and the intent of the user 220 is "going to Beijing." The language expression apparatus 210 may recognize that "purchasing of a train ticket for Beijing Railway Station," is the context and the intent of the user 220.

The context and the intent of the user 220 may be recognized as "purchasing of a train ticket for Beijing Railway Station," and the language expression apparatus 210 may generate a language expression appropriate for the recognized context and the intent.

The language expression apparatus 210 may generate a Chinese expression of "I would like to buy a train ticket for the Beijing Railway Station" as a basic sentence based on the intent of "purchasing of a train ticket for Beijing Railway Station," in consideration of the recognized context.

The language expression apparatus 210 may output a phonetic sign of the Chinese expression together with a translation in a user's language to help the understanding of the user 220.

As an example, the language expression apparatus 210 may further add detailed time information in addition to the generated Chinese expression.

In some embodiments, the user 220 may select and input the detailed time information, and a more detailed sentence including departure time information of the train collected by the language expression apparatus 210 may be generated.

For example, the language expression apparatus 210 may collect a train departure time table from a train ticket reservation server, and may generate a more detailed sentence of "I would like to buy a train ticket for Beijing Railway Station departing at 3 p.m.," that is, in Chinese as "我想买三点去北京的火车票." This statement may be based on the train departure time table that is unknown to the user 220.

The collected train departure time table may be provided as additional information. For example, if the user 220 does not know an exact departure time, the language expression apparatus 210 may access a server of a corresponding railway station, collect an appropriate time based on a time of the train heading to a destination, and use the information when generating the language expression. Thus, the language expression apparatus 210 may collect information that is unknown to the user and may generate a language based on the collected information.

The language expression apparatus 210 may generate the language expression of "I would like to buy a train ticket for Beijing Railway Station departing at 3 p.m," in Chinese, based on the current location (Shanghai) of the user 220. This information may be helpful to the user 220. For example, user 220 may show the generated language expression to a staff 230 at the ticket box to get the corresponding train ticket, or may control the generated language expression to be outputted through a speaker, thereby letting the staff 230 at the ticket box hear the generated language expression.

The user 220 may express a foreign language required for a corresponding context using the language expression apparatus 210 based on the context and the intent awareness.

The language expression apparatus 210, allows the user 220 to determine a corresponding foreign language expression more quickly than compared to searching for the corresponding foreign language expression from an electronic dictionary and the like. By combining the context and intent of a user, the accuracy of the language expression may be improved.

Figure 3:
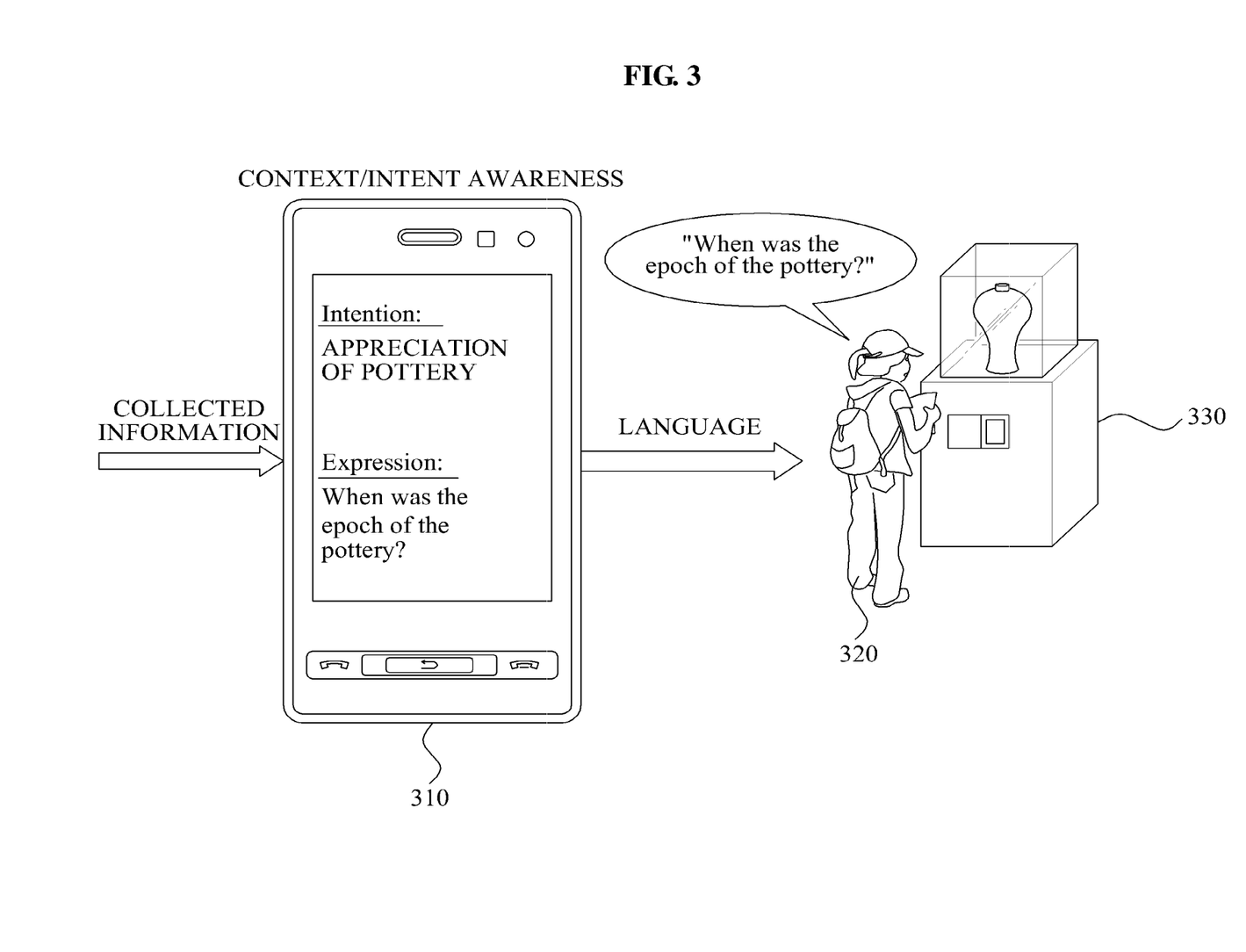
FIG. 3 is a diagram illustrating an example of a foreign language learning service provided by a language expression apparatus.

FIG. 3 illustrates an example of a foreign language learning service provided by a language expression apparatus 310.

A user 320 of the language expression apparatus 310, may view relics in the National Museum of Korea, and may learn an English expression related to a context or a foreign language expression that is appropriate for the context in the surrounding National Museum of Korea.

For example, the language expression apparatus 310 may generate corresponding foreign language expressions based on a language designated by the user 320. When the user 320 designates English as the designated language, the corresponding foreign language expressions may be generated in English.

The language expression apparatus 310 may receive an input of the desired language from the user. For example, the language expression apparatus 310 may provide a menu on a display of the language expression apparatus 310.

As another example, the language expression apparatus 310 may display an electronic map. A user may select a location on the electronic map and the language expression apparatus 310 may determine a language for expression based on a location selected on the electronic map.

The method of determining of the language for expression by selecting the location on the electronic map may be useful when the user 320 is not sure what language is used for each area.

For example, many languages are spoken throughout China, India, and Europe. Accordingly, although the user 320 does not know what language is used for the area where they are located, the user may select the location on the electronic map, and the language expression apparatus 310 may determine a language used in the corresponding area.

The language expression apparatus 310 may provide a foreign language expression based on the context of the user 320 or the intent of the user 320 in everyday life.

In some embodiments, the language expression apparatus 310 may recognize the current location of the user 320 using a GPS sensor. For example, the GPS sensor may recognize that the user 320 is standing in front of the recognized pottery in the National Museum of Korea using a camera. This information can be recognized as the context surrounding the user.

As another example, the language expression apparatus 310 may recognize the context that the user 320 is standing in front of the pottery from an RFID tag or a Bluetooth transmitter attached on a display stand using an RFID reader or a Bluetooth receiver.

The language expression apparatus 310 may recognize the intent of the user 320 from the context. For example, the language expression apparatus 310 may recognize that appreciation of the pottery is an abstract level of intent of the user, from the context that the user is standing in front of the pottery.

Accordingly, the language expression apparatus 310 may detail the intent from the abstract level of the intent based on domain knowledge.

In other words, the language expression apparatus 310 may detail the intent of the user, such as intention to know an epoch of the pottery and intention to know a use of the pottery, based on the knowledge related to the appreciation of the pottery.

When two or more intents are inferred, an optimal intent may be selected by using various evaluation functions. The evaluation functions may include an objective of study, a study history, a preference of the user, and the like, and may be selected. In some embodiments, even if the language expression is not completely identical to the intent of the user, the language expression for a corresponding context may be helpful for the study.

When the context and the intent are recognized, the language expression apparatus 310 may generate the language expression that expresses the derived context and the intent.

A detailed location, a time, and related information may be added to the context and intent. This information may be included in the expression thus making the information more detailed.

For example, the language expression apparatus 310 may generate an expression of "When was the epoch of the pottery?" based on the intent of a detailed question of the user, for example, "When was the epoch of the pottery?"

The language expression apparatus 310 may convert the generated English expression of "When was the epoch of the pottery?" into a sound signal or may output the generated English expression as a text and may transfer the outputted text to the user 320.

The language expression apparatus 310 may allow a user to learn a language expression of a foreign language appropriate for everyday life. The acquirement rate of a language may be increased in association with the context and the intent, and accessibility is more efficient because there is no need of accessing a translation dictionary, an on-line lecture, or the like.

Figure 4:
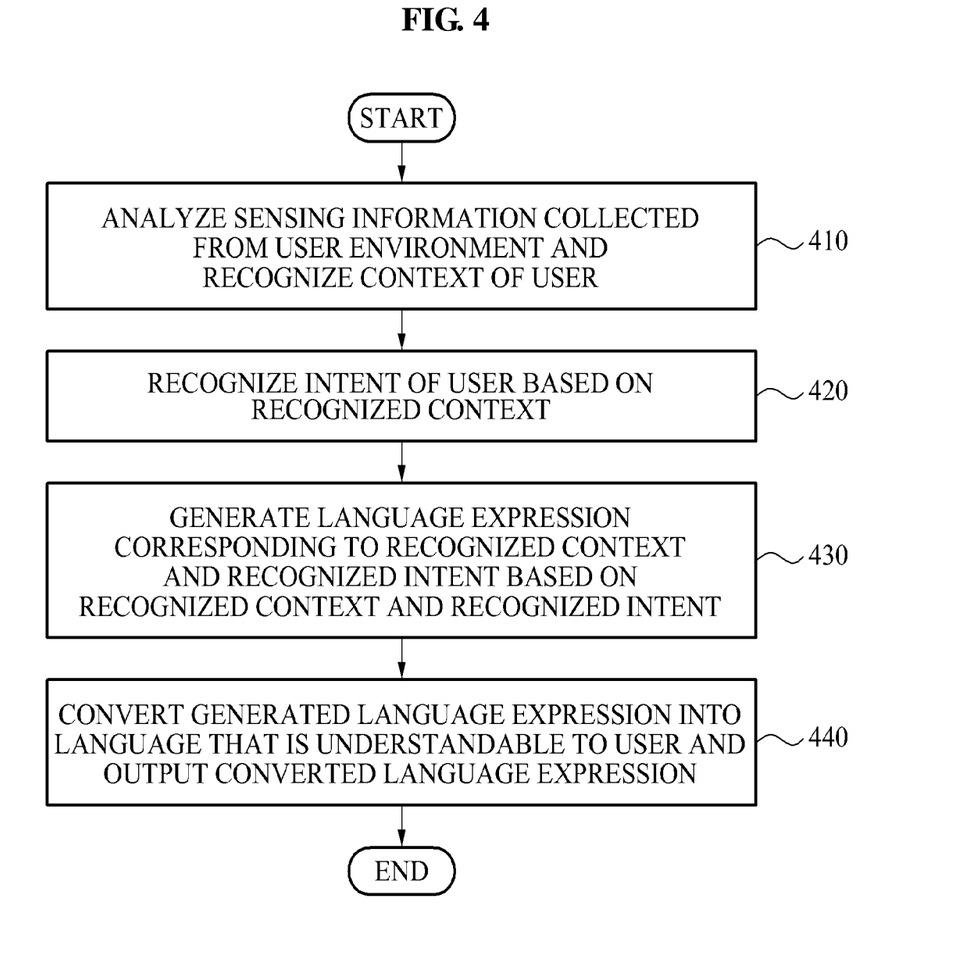
FIG. 4 is a flowchart illustrating an example of a language expression method.

FIG. 4 illustrates an example of a language expression method.

Referring to FIG. 4, the language expression method analyzes sensing information collected from a user environment and recognizes a context of a user, in 410.

In 420, the language expression method recognizes an intent of the user based on the recognized context.

The language expression method generates a language expression corresponding to the recognized context and the recognized intent, based on the recognized context and the recognized intent, in 430.

In 440, the language expression method converts the generated language expression into a language that is understandable to the user, and outputs the converted language.

The language expression method may combine the collected sensing information with a knowledge model or a user model, thereby recognizing the context of the user.

The language expression method may perform at least one of a retrieval analysis, a logical inference, and a pattern recognition using the combined context and intent information, thereby recognizing the context of the user.

The language expression method may combine the recognized context with at least one of a cognitive model, a knowledge model, and a user model, and may derive at least one inference intent, to recognize the intent of the user.

The language expression method may collect sensing data through a hardware sensor or a software sensor from the user environment, to recognize the context of the user.

The language expression method may generate a first language expression by selecting, for example, at least one of a form, a sentence, a phrase, and the like. The form, the sentence, and the phrase correspond to the recognized context and the recognized intent. The language expression method may combine the first language expression with the collected sensing information, and may generate a second language expression corresponding to the recognized context and the recognized intent, thereby generating a language expression.

The language expression method may convert the second language expression into a language that is understandable to the user and may output the converted language, thereby converting the generated language expression into the language that is understandable to the user and outputting the converted language.

The processes, functions, methods and software described above may be recorded, stored, or fixed in one or more computer-readable storage media that includes program instructions to implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes or program instructions may be stored and executed in a decentralized manner.

According to certain examples described above, the language expression apparatus and method may recognize a context and an intent and express them as a language expression, thereby a cost expended for recognizing a voice language and for processing a natural language may be reduced.

According to certain examples described above, the language expression apparatus and method may express a context and an intent of the user, and may express more concretely compared with a voice language that a user speaks, even under condition where the voice language is not able to be provided.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for language expression based on context and intent awareness, the apparatus comprising:

a context recognizing unit configured to recognize a context of a user by analyzing sensing information collected from the user's environment;

an intent recognizing unit configured to recognize an intent of the user based on the recognized context;

a language generating unit configured to generate a language expression based on the recognized context and the recognized intent and refine the substance of the language expression based upon information gathered from a source independent of the sensing information; and an output unit configured to convert the refined language expression into a language that is understandable to the user, and to output the converted language expression.

2. The apparatus of claim 1, further comprising:

a knowledge database configured to store and maintain a knowledge model of at least one domain knowledge;

a behavioral model database configured to store and maintain a user behavior information model including at least one of a user profile of the user, a preference of the user, and a pattern of the user; and a language database configured to store and maintain data with respect to the language that is understandable to the user.

3. The apparatus of claim 2, wherein the context recognizing unit recognizes the context of the user through at least one of a retrieval analysis with respect to the user's environment, a logical inference, and a pattern recognition, and combines the collected sensing information with the knowledge model or the behavioral model.

4. The apparatus of claim 2, wherein the intent recognizing unit derives at least one inference intent by combining the recognized context with at least one of a cognitive model, the knowledge model, and the behavioral model.

5. The apparatus of claim 4, wherein the intent recognizing unit recognizes the intent of the user based on a predetermined evaluation function predetermined for the at least one analyzed inference intent.

6. The apparatus of claim 5, wherein the evaluation function analyzes a result of an evaluation with respect to a preference of the user and a detailed intent of the user corresponding to the at least one analyzed inference intent.

7. The apparatus of claim 1, further comprising:

an information collecting unit configured to collect the sensing information from the user's environment through at least one of a hardware sensor and a software sensor.

8. The apparatus of claim 7, wherein the hardware sensor comprises at least one of a location identification sensor, a proximity identification sensor, a radio frequency identification (RFID) tag identification sensor, a motion sensor, an acceleration sensor, a gravity sensor, a pressure sensor, a sound sensor, a vision sensor, a touch sensor, a temperature sensor, a humidity sensor, a light sensor, and a bio-sensor.

9. The apparatus of claim 7, wherein the software sensor collects sensing data from at least one of an electronic calendar application, a scheduler application, an e-mail management application, a message management application, a communication application, a social network application, and a web site management application.

10. The apparatus of claim 1, wherein the language generating unit generates a first language expression by selecting at least one of a form, a sentence, and a phrase corresponding to the recognized context and the recognized intent.

11. The apparatus of claim 10, wherein the language generating unit generates a second language expression corresponding to the recognized context and the recognized intent, by combining the first language expression with the collected sensing information.

12. The apparatus of claim 11, wherein the output unit converts the second language expression into the language that is understandable to the user and outputs the converted second language expression.

13. The apparatus of claim 1, wherein the language generating unit performs one of setting of a language for the language expression based on a location of the user, and receiving of language set information for the language expression from the user.

14. A method for language expression based on context and intent awareness, the method comprising:

recognizing, with a processor, a context of a user by analyzing sensing information collected from the user's environment;

recognizing an intent of the user based on the recognized context;

generating the language expression based on the recognized context and the recognized intent and refining the substance of the language expression based upon information gathered from a source independent of the sensing information;

converting the refined language expression into a language that is understandable to the user; and outputting the converted language expression.

15. The method of claim 14, wherein recognizing the context of the user comprises:

recognizing the context of the user through at least one of a retrieval analysis with respect to the user's environment, a logical inference, and a pattern recognition, and combining the collected sensing information with a knowledge model or a behavioral model.

16. The method of claim 14, wherein the recognizing of the intent of the user comprises deriving at least one inference intent by combining the recognized context with at least one of a cognitive model, a knowledge model, and a behavioral model.

17. The method of claim 14, wherein the recognizing of the context of the user comprises:

collecting the sensing information from the user's environment through at least one of a hardware sensor and a software sensor.

18. The method of claim 14, wherein the generating of the language expression comprises:

generating a first language expression by selecting at least one of a form, a sentence, and a phrase, corresponding to the recognized context and the recognized intent, and generating a second language expression corresponding to the recognized context and the recognized intent, by combining the first language expression with the collected sensing information.

19. The method of claim 18, wherein the converting and outputting of the language expression comprises:

converting the second language expression into the language that is understandable to the user, and outputting the converted second language expression.

20. A non-transitory computer readable storage medium storing instructions that, when executed by a processor, cause the processor to implement a method comprising:

recognizing a context of a user by analyzing sensing information collected from the user's environment;

recognizing an intent of the user based on the recognized context;

generating a language expression based on the recognized context and the recognized intent and refining the substance of the language expression based upon information gathered from a source independent of the sensing information;
converting the refined language expression into a language that is understandable to the user; and
outputting the converted language expression.

* * * * *